Figure 1:
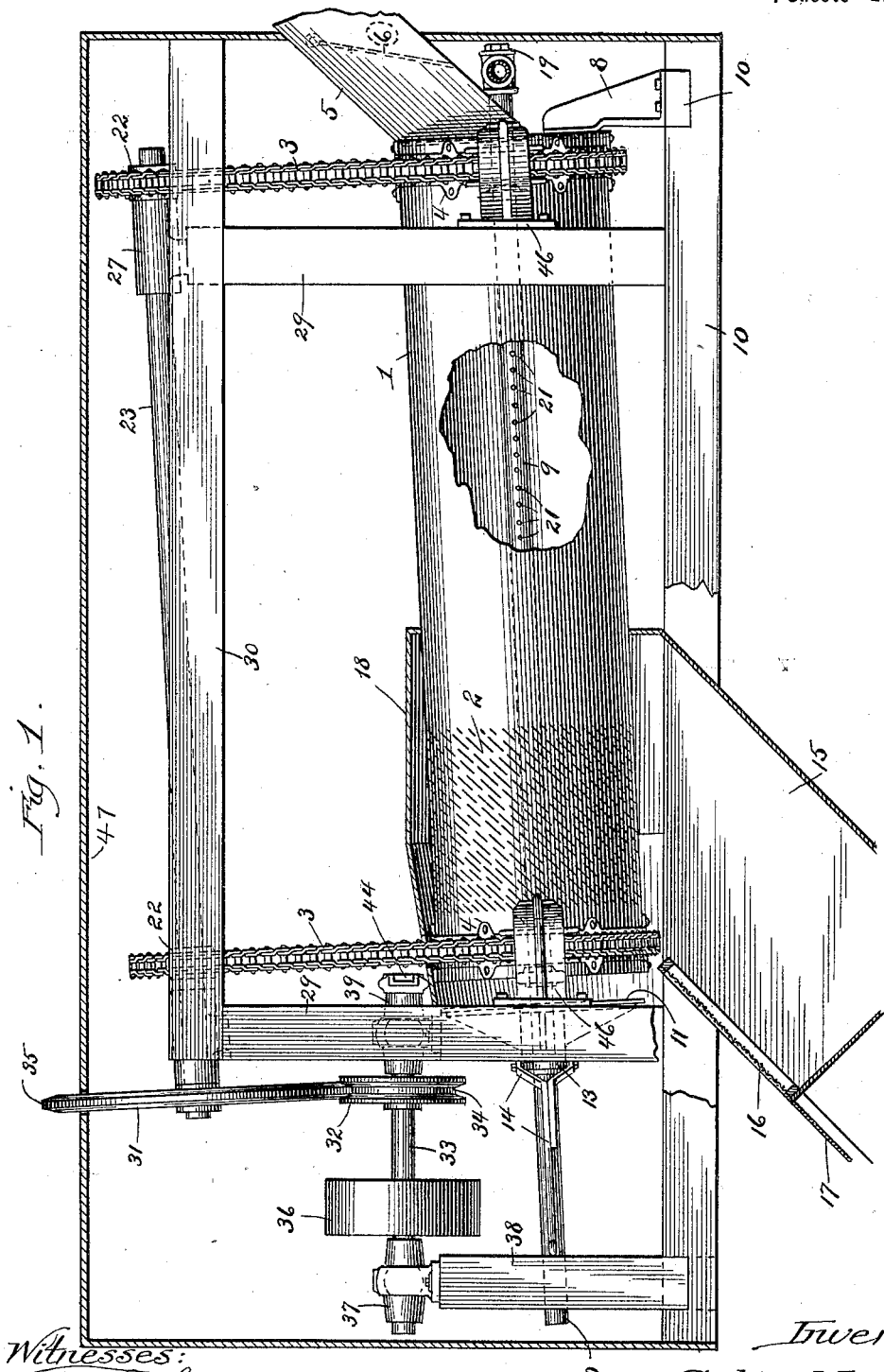

No. 696,396. Patented Apr. 1, 1902.
C. M. AVERY.
MACHINE FOR PULVERIZING AND SEPARATING LIME.
(Application filed Nov. 1, 1900.)
(No Model.) 4 Sheets—Sheet 1.

Witnesses:
Frank Blanchard
Charles L. Herrick

Inventor:
Colby M. Avery
By Jesse & H. M. Cox
Attorneys.

THE NORRIS PETERS CO., PHOTO-LITHO., WASHINGTON, D. C.

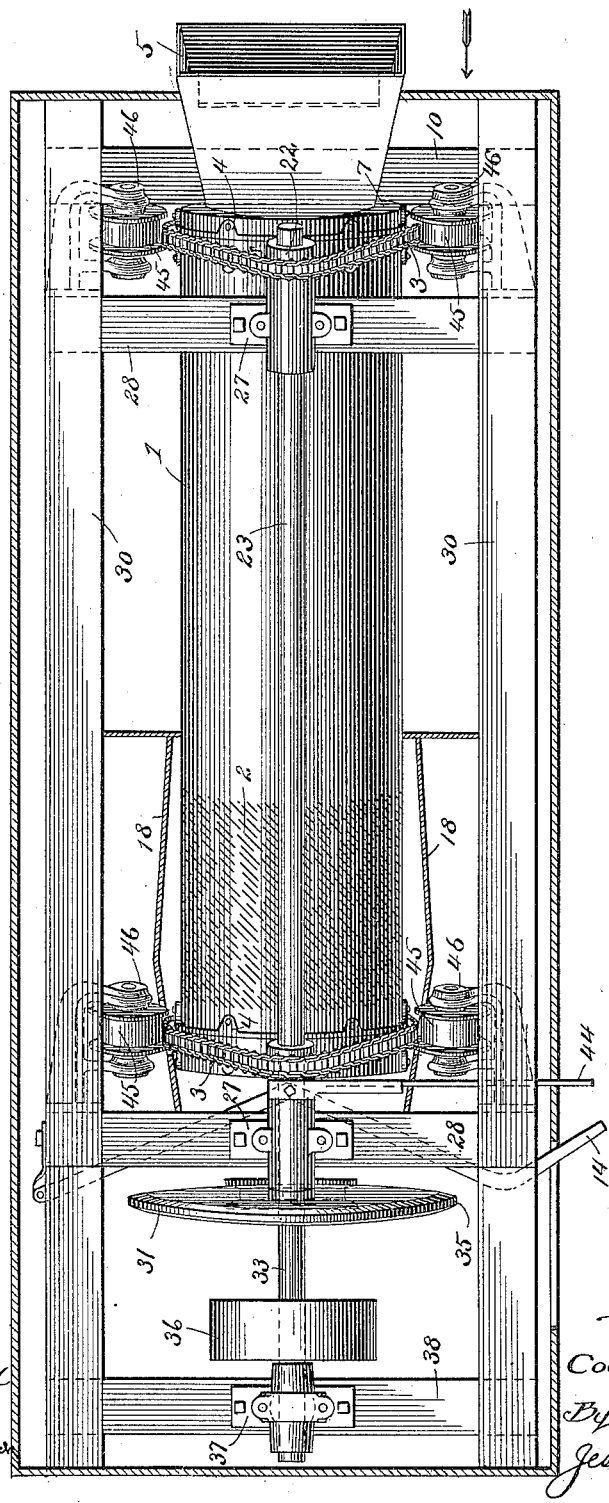

No. 696,396. Patented Apr. 1, 1902.
C. M. AVERY.
MACHINE FOR PULVERIZING AND SEPARATING LIME.
(Application filed Nov. 1, 1900.)
(No Model.) 4 Sheets—Sheet 3.
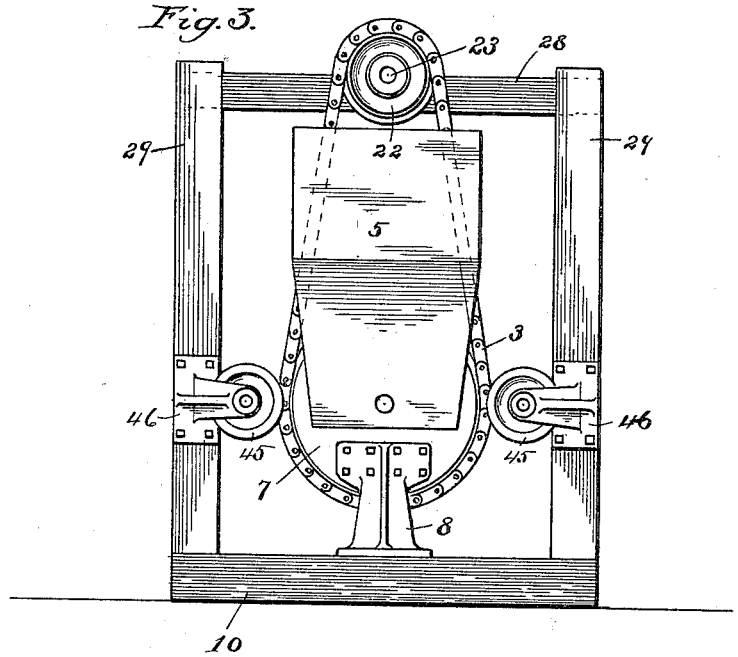
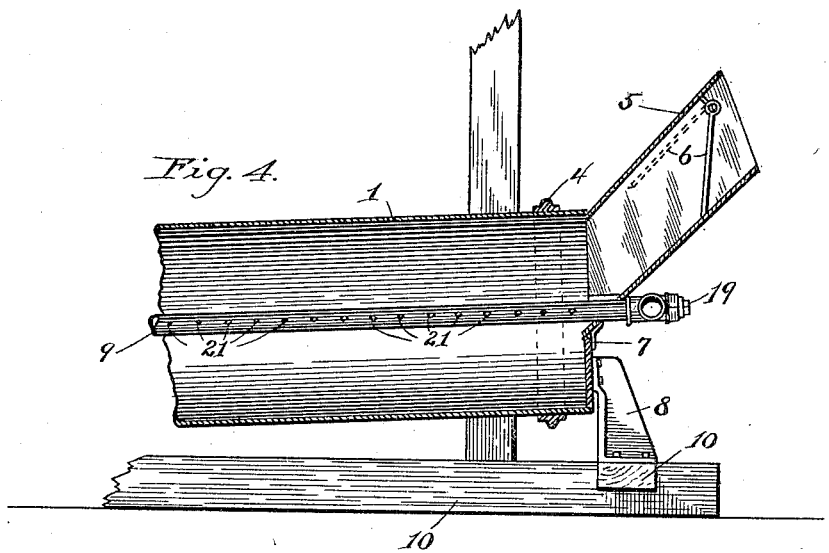
Witnesses
Frank S. Blanchard
Charles L. Herrick
Inventor
Colby M. Avery
By Jesse & H. M. Cox
Attorneys.

No. 696,396. Patented Apr. 1, 1902.
C. M. AVERY.
MACHINE FOR PULVERIZING AND SEPARATING LIME.
(Application filed Nov. 1, 1900.)
(No Model.) 4 Sheets—Sheet 4.
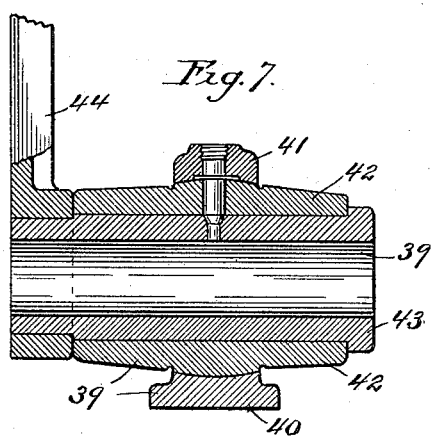
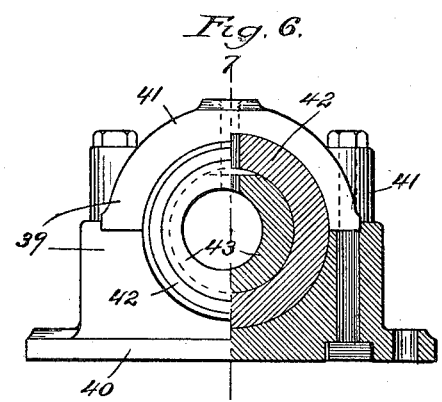
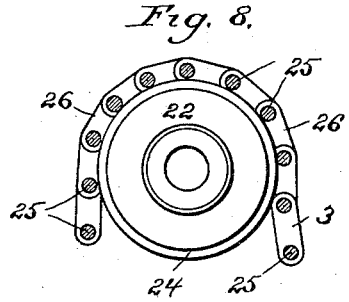
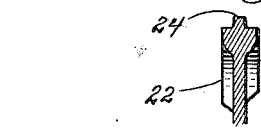
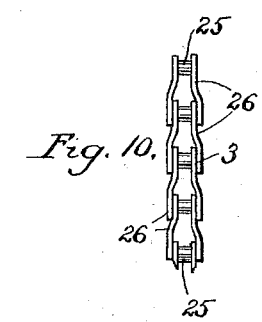
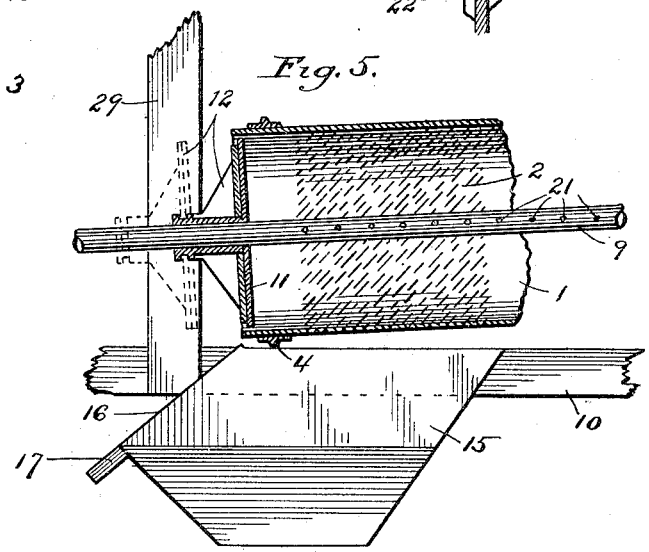
Witnesses:
Frank J. Blanchard
Charles L. Herrick
Inventor:
Colby M. Avery
By Jesse & H. M. Cox
Attorneys

UNITED STATES PATENT OFFICE.

COLBY M. AVERY, OF CHICAGO, ILLINOIS, ASSIGNOR TO THE CHISHOLM, BOYD & WHITE COMPANY, A CORPORATION OF ILLINOIS.

MACHINE FOR PULVERIZING AND SEPARATING LIME.

SPECIFICATION forming part of Letters Patent No. 696,396, dated April 1, 1902.

Application filed November 1, 1900. Serial No. 35,108. (No model.)

*To all whom it may concern:*

Be it known that I, COLBY M. AVERY, a citizen of the United States, residing in the city of Chicago, county of Cook, and State of Illinois, have invented a new and useful Improvement in Machines for Pulverizing and Separating Lime, of which the following is a specification.

My invention relates to machines wherein calcium oxid or quicklime is pulverized and separated from insoluble foreign substances; and the objects of my invention are, first, to provide means for exposing the lime to the action of steam in a closed vessel; second, to agitate the lime within said vessel; third, to sift or screen the resulting powder from the unreduced masses of lime and non-reducible foreign matter; fourth, to provide means for carrying off separately the said powder and the said foreign matter, and, fifth, to provide certain details hereinafter set forth. I attain these objects by the mechanism illustrated in the accompanying drawings, in which—

Figure 1 is a side view of the complete machine, the outer housing and discharge-hopper being shown in vertical section. Fig. 2 is a plan view of the machine, showing the outer housing in horizontal section. Fig. 3 is an end view of the machine looking in the direction of the arrow, Fig. 2. Fig. 4 is a view of the receiving end of the revolving barrel and charging-spout, shown in vertical longitudinal section. Fig. 5 is a view of the discharging end of the revolving barrel, shown in vertical longitudinal section. Fig. 6 is an end view, partly in section, of the eccentric bearing for supporting the friction-drive. Fig. 7 is a sectional view of the said eccentric bearing, taken on the line 7 7, Fig. 6. Fig. 8 is a side view of one of the upper driving-wheels, showing the supporting-chain in position thereon, said chain being shown in section taken transversely through the pivot-pins thereof. Fig. 9 is a transverse sectional view of the rim of a chain-driving wheel. Fig. 10 is a detail view showing the construction of the supporting and driving chain.

Similar figures of reference refer to similar parts throughout the several views.

The revolving barrel 1 consists, preferably, of a metallic cylinder and is imperforate for about two-thirds of its length at the portion nearest the receiving extremity thereof. Located at or near the discharging extremity of the said barrel and extending approximately one-third of the length thereof is a slotted or apertured portion 2, which constitutes a screen or sieve for permitting the escape of finely-divided particles of matter.

The barrel 1 is revolubly suspended by means of the chains 3 3, which run upon the guides or tracks 4 4, located, preferably, near the extremities of said barrel. The charging-spout 5, which is stationary, leads into the upper or receiving extremity of the barrel and is provided with a hinged door 6, constructed in such a manner as to swing inwardly when material is introduced into said spout and return by reason of its own weight and close said spout when the entering material has passed. The back head 7 is mounted upon the standard 8 and forms a support for the lower extremity of said spout 5. Said back head and spout serve to close the upper end of the barrel 1, and said back head also constitutes a support for the steam-pipe 9, hereinafter described. The standard 8 is secured to one of the sills 10 10, which form part of the supporting-framework of the machine.

The lower or discharging extremity of the barrel 1 is closed by means of the front head 11, which is attached to the spider 12. Said spider is supported upon the stationary pipe 9 and is movable longitudinally thereon by means of a yoke 13 and lever 14. (Indicated in Figs. 1 and 2.) By this construction the front head 11 may be withdrawn from the barrel sufficiently to permit the removal of masses of stone or other substances too large to pass through the barrel-screen 2. The discharge-hopper 15 is located beneath the barrel 1, so as to receive material passing through said screen 2, and is provided with an auxiliary stationary screen 16, located beneath the discharging extremity of the barrel 1 in such a position as to receive the larger masses as they are being removed from said barrel and re-sieve the same, thereby permitting any remaining powder to pass into the hopper 15 and the larger masses to escape over the apron 17.

In order to make the barrel 1 substantially air and dust tight, the perforate extremity thereof is inclosed in the housing 18, said housing being open at the bottom and communicating with the discharge-hopper 15. The stationary pipe 9, above mentioned, extends through said barrel 1 along the axis thereof and is connected at its upper extremity to a source of steam-supply. At said upper extremity there is also provided a plug 19, whereby access may be had to the interior of said pipe for cleaning purposes. The lower extremity 20 of said pipe is closed in any suitable manner and provided with a drain (not shown) for drawing off the water of condensation. The portion of said pipe 9 lying within the barrel 1 is provided with a series of apertures 21, located so as to discharge steam from both sides of said pipe at points preferably about the height of the central axis thereof. As the apertures 21 are thus situated above the bottom portion of said pipe, the steam issuing therefrom will be substantially dry, while any water of condensation formed in said pipe may be carried off without escaping into the barrel. Both the barrel 1 and pipe 9 have an inclination or pitch from their receiving extremities downward toward their discharging extremities. By this construction the water of condensation in the pipe 9 tends to drain toward the lower extremity of said pipe and the material within the barrel 1 tends to move toward the screen 2 and front head 11 when said barrel revolves.

The barrel-supporting chains 3, above mentioned, are suspended from the driving-wheels 22 22, which are rigidly fixed upon the main shaft 23 of the machine. The construction of said wheels and chain is best shown in Figs. 8, 9, and 10, said wheels having a projecting tread 24, upon which travel the pivot-pins 25 25 of the chains 3. The side faces of the links 26 26, which connect said pins 25, are of width greater than the diameter of said pins, and therefore form lips or flanges, which engage the sides of said tread 24 and prevent the chains from becoming dislodged from said wheels. Said tread 24 is beveled, as shown, and the distance between the links 26 of said chain is such that said tread wedges between said links, thereby acquiring greater traction for driving said chains.

The pillow-blocks 27 27 are mounted upon the cross-timbers 28 28, said timbers being carried by the uprights 29 29 and constituting part of the framework of the machine. The longitudinal timbers 30 30 connect said cross-timbers 28 and also form part of said framework.

The main shaft 23 is driven by means of the friction-wheel 31, which in turn is engaged and driven by the friction-wheel 32, secured to the counter-shaft 33. In the preferred construction the wheel 32 has a beveled channel or groove 34, which receives the correspondingly-beveled rim 35 of said wheel 31, thereby increasing the efficiency of power transmission between said wheels. The counter-shaft 33 is driven by means of the band-wheel 36 and has a bearing in the universal pillow-block 37, mounted on the framework 38. By means of said universal or self-adjusting block 37 considerable lateral play is permitted to the portion of said shaft 33 which carries the wheel 32. The lateral play of the shaft, as above mentioned, permits the wheel 32 to be moved into and out of engagement with the wheel 31, and such motion of the wheel 32 is accomplished by means of the eccentric bearing 39. (Shown in detail in Figs. 6 and 7.) Said bearing 39 consists of the base 40 and cap 41, which are provided with concave spherical portions for receiving corresponding convex spherical portions of the bearing-sleeve 42 in the manner common to self-adjusting bearings. Said sleeve 42 is bored longitudinally to receive the eccentric sleeve 43, wherein the shaft 33 bears. The axes of the inner and outer cylindrical surfaces of the sleeve 43 are parallel, but removed one from the other, so that the walls of said sleeve vary in thickness at different portions of their circumferences. By this means when the eccentric sleeve 43 is rotated in the sleeve 42 the inclosed portion of the shaft 33 is moved laterally, so as to throw the wheel 32 into and out of engagement with the wheel 31. The rotation of said sleeve 43 is accomplished by means of the starting-lever 44.

As the barrel 1 is simply suspended in the chains 3 3, with the axis thereof inclined to the horizontal, the guide-wheels 45 45 are provided to guide the said chains, and thereby prevent undue play of said barrel either in the direction of the axis thereof or in a transverse direction. Said wheels 45 are mounted in the brackets 46, attached to the uprights 29 of the framework.

In order to prevent loss of heat and the escape of dust, the machine is inclosed within the outer housing 47. (Shown in section in Figs. 1 and 2.)

In operation the starting-lever 44 is thrown so that the revolving wheel 32 engages the wheels 31, and thereby causes the revolution of the main shaft 23. The revolution of the shaft 23 is transmitted to the barrel 1 by means of the suspending-chains 3 3. Lime is then introduced into the spout 5 in the condition in which said lime comes from the kiln—that is, in hard lumps or masses frequently containing stone or other insoluble matter. The charge of lime entering said spout raises the door 6, said door dropping into a closed position after the lime has passed, thereby preventing the escape of heat and dust. Steam is turned on so as to enter the pipe 9 and escape from the apertures 21 into the barrel 1. The action of the steam combined with the rotation of the barrel causes the disintegration and pulverization of the masses of lime, the contents of the barrel simultaneously gravitating toward the perforate portion or screen 2. As the material within the barrel reaches said screen 2 the finely-divided particles pass through said screen and fall into the hopper 15. The stone and other insoluble masses are retained in the barrel and finally collect at the lower extremity thereof adjacent to the front head 11. After the process has been continued until a considerable amount of material has collected in the manner described the front head 11 is withdrawn from the barrel and the said stone and other unreduced masses removed. During removal the rejected material falls from said barrel onto the auxiliary screen 16, and is thus subjected to a second screening process, thereby preventing the loss of any powdered lime which may have been carried over mechanically by the larger lumps. Such of the lime as will pass through said screen 16 falls into the hopper 15, while the larger masses pass over the apron 17 to be subsequently removed. On account of the construction of the pipe 9 the steam entering the barrel 1 is substantially dry, the water of condensation being carried off by the under imperforate portion of said pipe. The water collecting at the lower extremity of said pipe is drawn off from time to time to prevent overflow of water through the apertures 21.

It will be understood that the barrel 1 is not necessarily sufficiently tight to maintain a pressure greater than atmospheric pressure; but it is desirable that said barrel be so thoroughly housed as to prevent the escape of dust or undue loss of heat through radiation.

Attention is directed to a companion application for the process of pulverizing lime, filed by me this day, Serial No. 35,109.

What I claim as new, and desire to secure by Letters Patent, is—

1. In a machine for pulverizing lime, an inclined revolving barrel, having a perforate portion near the lower end thereof constituting a screen, and means for supplying steam to said barrel, in combination with a hopper beneath said perforate portion, and a removable head at the lower end of said barrel for permitting the removal of material from said barrel.

2. In a machine for pulverizing lime, an inclined revolving barrel, having a perforate portion near the lower end thereof, constituting a screen, and means for supplying steam to said barrel, in combination with a stationary head for closing the receiving extremity of said barrel, a spout connected to said head for introducing lime into said barrel, a door in said spout hinged near its upper extremity and opening inwardly toward said barrel, and means for closing the opposite extremity of said barrel.

3. In a machine for pulverizing lime, the combination of an inclined revolving barrel the lower portion whereof constitutes a screen, a pipe for introducing steam into said barrel, a hopper beneath said screen, a housing over said screen, means for introducing lime into the upper extremity of said barrel, and a removable head at the lower extremity of said barrel.

4. In a machine for pulverizing lime, the combination of a revolving barrel, means for supplying steam thereto, other means for closing the receiving extremity of said barrel, and a front head for closing the discharging extremity of said barrel, said front head being movable away from said barrel thereby permitting the removal of material therefrom.

5. In a machine for pulverizing lime, the combination of a closed revolving barrel, means for supplying steam thereto, and chains for suspending and revolving said barrel.

6. In a machine for pulverizing lime, the combination of a closed revolving barrel, means for supplying steam thereto, tracks or guides encircling said barrel, chains running upon said tracks or guides and suspending said barrel, and wheels located above said barrel for suspending said chains.

7. In a machine for pulverizing lime the combination of a revolving barrel, means for supplying a heated fluid thereto, a main driving-shaft, means for suspending said barrel from said shaft and friction-gears for driving said shaft.

8. In a machine for pulverizing lime, the combination of a revolving barrel, means for supplying steam thereto, a main driving-shaft, means for suspending said barrel from said shaft, friction-gears for driving said shaft, and an eccentric bearing whereby the driving friction-gear may be moved into and out of engagement with the driven friction-gear.

9. In a combined pulverizing and separating machine for lime, the combination of a vessel for receiving the lime, said vessel having a perforated portion constituting a sieve or screen for permitting the escape of pulverized material, means for agitating said vessel, and means for supplying a heated fluid thereto.

10. In a pulverizer and separator for lime, the combination of a revolving barrel suitably closed at the ends, and having its axis inclined to the horizontal, a screen constituting a portion of said barrel located at the lower end thereof, a housing inclosing the screen portion of said barrel and means for supplying steam to said barrel.

11. In a pulverizer and separator for lime, the combination of a closed revolving barrel, the axis whereof is inclined, said barrel being perforated near the lower extremity thereof for screening the contents of said barrel, a housing over said perforated portion of said barrel, a second housing inclosing said barrel and said inner housing, and means for supplying steam to said barrel.

12. In a pulverizer for lime, the combination of a barrel, means for introducing steam thereto, chains for supporting said barrel, and traction or driving wheels for supporting and driving said chains, said wheels having beveled rims, and said chains having links fitting over said wheels and wedging upon the rims thereof substantially as described.

13. In a pulverizer for lime, the combination of a revolving barrel, means for introducing steam thereto, chains for suspending said barrel, means for supporting said chains, and guide-wheels for guiding said chains thereby determining the angle of inclination thereof.

14. In a lime-separator, the combination of a closed revolving barrel perforated at one portion to form a screen a housing over said screen, a removable head to said barrel, a hopper under said screen and connecting with said housing, an auxiliary screen beneath said removable head, said screen also connecting with said hopper, and means for supplying steam to said barrel.

15. In a machine for pulverizing lime, the combination of a revolving barrel, having a perforate portion constituting a screen, means for supplying steam to said barrel means for temporarily closing the extremities of said barrel, a hopper beneath the screen portion of said barrel, and a secondary screen beneath one extremity of said barrel, and above a portion of said hopper.

COLBY M. AVERY.

Witnesses:
CHARLES L. HERRICK,
ARTHUR M. COX.